May 15, 1934.   A. ROSENTHAL ET AL   1,959,065
DRAFT HITCH
Filed Dec. 16, 1932   2 Sheets-Sheet 2
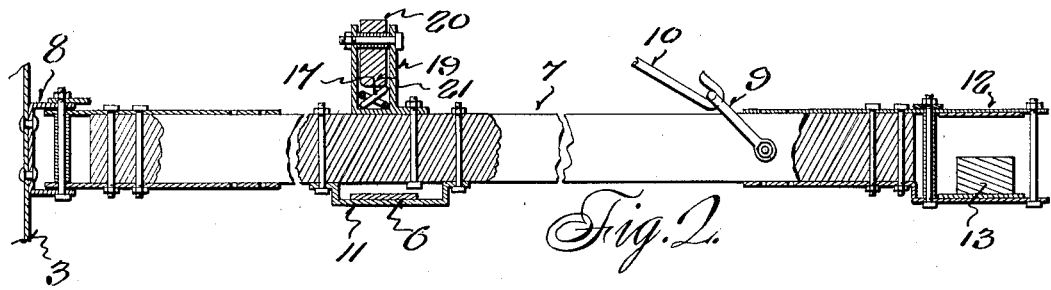
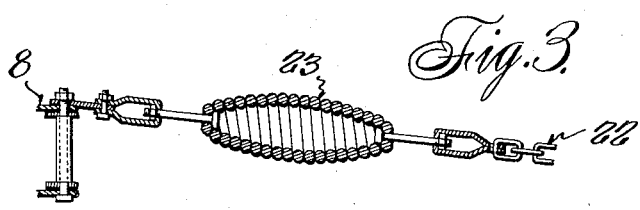
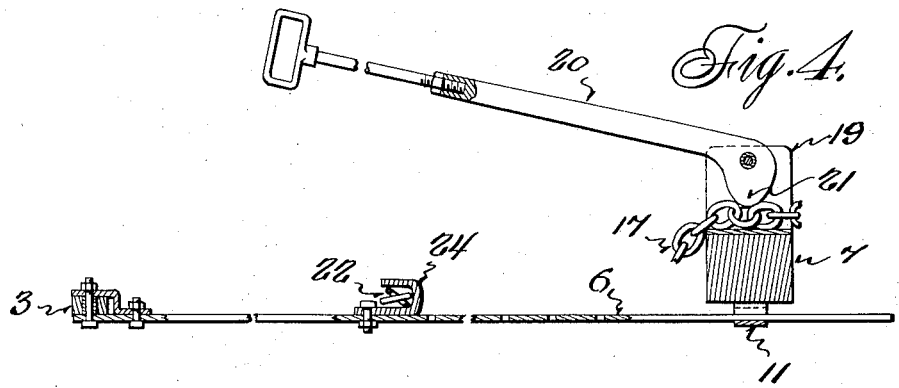
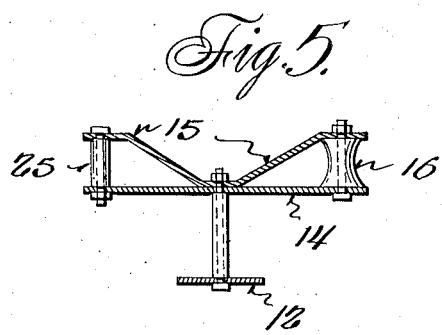
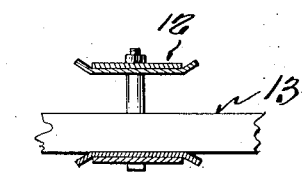
Inventors
Henry L. Rosenthal
August Rosenthal
By Young & Young
Attorneys Patented May 15, 1934

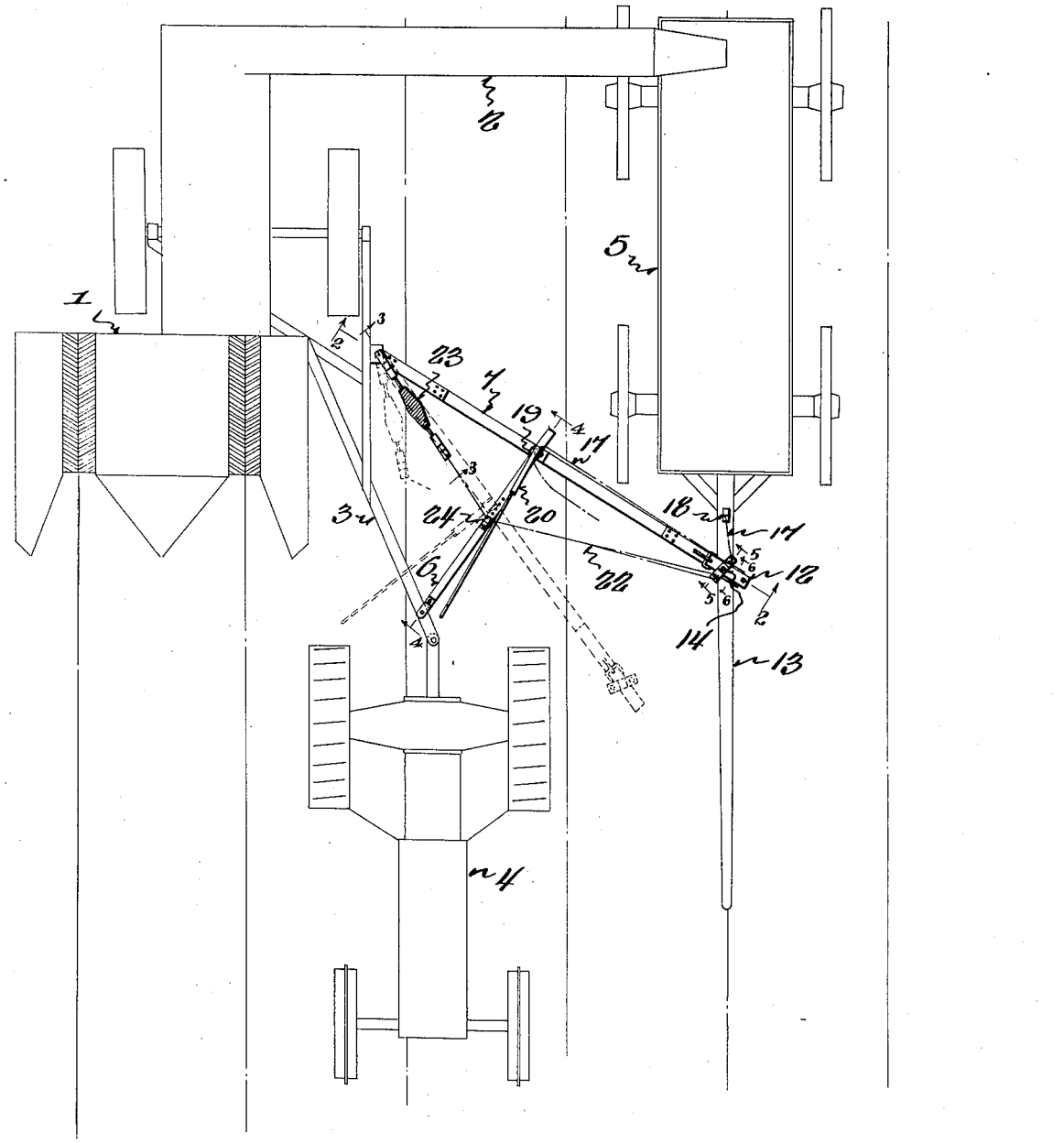

1,959,065

UNITED STATES PATENT OFFICE 1,959,065

DRAFT HITCH

August Rosenthal and Henry L. Rosenthal, Wauwatosa, Wis., assignors to Rosenthal Manufacturing Co., West Allis, Wis.

Application December 16, 1932, Serial No. 647,535

9 Claims. (Cl. 280—33.44)

This invention pertains to draft hitches, and more particularly to a hitch adapted to draw a wagon or trailer at one side of an implement, such as in harvesting corn and the like, wherein it is desired to discharge material laterally from an implement into a wagon or other drawn receptacle.

The invention has primarily for its object to provide a comparatively simple and efficient hitch of the foregoing character, which provides for drawing the vehicle at one side of the implement and permits ready adjustment of the relative position of the vehicle and implement.

A further object resides in the provision of a hitch, wherein the draw is obtained through a resilient connection, thus absorbing sudden shocks and strains.

A still further object is to provide a hitch in which the strain is exerted substantially longitudinally upon the draft bar, although the same is laterally positioned with relation to the pull.

Another object resides in the provision of a hitch of the foregoing character, which is entirely supported by the implement and tractor, thus facilitating attachment of the drawn vehicle.

With the above and other objects in view, which will appear as the description proceeds, the invention resides in the novel construction, combination, and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is a schematic plan view of a tractor, implement, and vehicle with a hitch constructed in accordance with the present invention applied thereto;

Figure 2 is a longitudinal section through the draft bar taken on the line 2—2 of Figure 1;

Figure 3 is a detail section taken on the line 3—3 of Figure 1;

Figure 4 is a longitudinal section through the draw bar indicated by the line 4—4 of Figure 1;

Figure 5 is a transverse section taken on the line 5—5 of Figure 1; and

Figure 6 is a similar view taken on the line 6—6 of Figure 1.

Referring now more particularly to the accompanying drawings, the numeral 1 designates a wheel supported implement, such as a corn harvester provided with a lateral discharge conveyor 2 and a draft frame 3 for connection with the draw bar of the tractor 4.

As set forth in the objects, it is desirable with certain classes of implements, such as corn harvesters, to discharge the finished material into a wagon or other drawn receptacle, and in general it has been found more practical to discharge the material laterally of the implement, as illustrated, thus requiring the wagon 5 to be drawn at the side of the implement.

In addition to drawing the wagon in proper relative position to the implement, other problems arise, namely, distribution of the material in the wagon, and in order to compensate for this, a practical hitch must be provided with means whereby the wagon may be shifted longitudinally with relation to the discharge of material from the implement.

The present invention, which solves the foregoing problems, comprises a draw bar 6 and a draft bar 7, the latter being pivotally connected to a clevis 8 carried by the draft frame of the implement 1.

To further support the draft bar, the same is provided adjacent its outer end with a yoke 9 for reception of a hook 10 for connection with a suitable portion of the implement.

The draw bar 6 has one side pivotally connected with the draft frame 3 of the implement 1, while its opposite end is slidably carried in a bracket 11 secured to the underside of the draft bar intermediate its ends.

The outer end of the draft bar 7 is provided with a clevis 12 for reception of a tongue 13 of the vehicle 5, and obviously inasmuch as the draft bar is supported by the implement, the tongue 13 is relieved from all strain and weight, and therefore has no tendency to sag toward the ground.

Pivotally mounted on top of the clevis 12 is a bracket 14 comprising lateral arms 15, one of which carries a sheave 16 having trained thereover a chain or cable 17, one end of which is fastened to a clip 18 carried by the wagon tongue 13. The opposite end of the chain 17 is trained through a U-shaped bracket 19 secured to the top of the draft bar 7 intermediate its ends, and in approximate alignment with the draw bar supporting bracket 11. Pivotally mounted between the sides of the U-shaped bracket 19 is a lever 20 provided with a wedging nose 21 cooperating with the bracket 19 to normally grip the free end of the cable 17 and retain the same in adjusted position.

As best shown in Figure 1, the lever 20 extends forwardly from the draft bar into proximity with the driver, who is positioned at the rear of the tractor 4. Consequently, when it is desired to change the relative movement of the wagon 5, that is, to allow the same to drop rearwardly with relation to the discharge conveyor 2 of the implement, it is merely necessary for the driver to raise the lever 20, thus releasing the free end of the chain 17 to permit the same to run out over the sheave 16. In this manner, the wagon 5 is allowed to gradually drop rearwardly with relation to the discharge conveyor 2, thus providing for even distribution of material in the wagon.

While the draw bar 6 is positioned substantially at a right angle to the draft bar 7, the same has no direct connection therewith, as a direct lateral pull on the draw bar would result in considerable strain thereon, requiring an exceedingly heavy rigid bar to withstand the same. To avoid this, necessary pull upon the draft bar is obtained through a cable 22, one end of which is connected with a spiral spring 23, in turn connected to the clevis 8 carried by draft frame 3 of the implement. The cable or chain 22 is passed through a clip 24 adjustably carried by the draw bar 6 and thence around the stud 25 carried by one of the arms 15 of the bracket 14. The free end of the chain 22 is secured in any suitable manner, thus providing a truss connection between the draw bar 6 and the draft bar 7. Obviously, any sudden strain or jerk exerted upon the draft bar 7 will be taken up by the spring 23, thus relieving strain upon the tractor and implement.

It will also be appreciated that by regulating the length of the chain 22, the position of the draft bar 7 may be varied, as indicated in dotted lines in Figure 1, to vary the lateral position of the wagon relative to the implement.

It will further be appreciated that through the truss connection between the draw bar and draft frame, obtained by means of the chain 22, pulling strain upon the draft bar 7 is exerted substantially longitudinallly upon the ends of the draft bar 7, thus allowing an exceedingly light bar to be employed, as the main pull on the wagon is obtained through the chain 22, the bracket 14, and the chain 17, the draft bar 7 merely serving to hold the wagon in lateral spaced position relative to the implement.

From the foregoing explanation considered with the accompanying drawings, it will be readily seen that a comparatively simple draft apparatus has been provided which is readily adjustable to various positions within a wide range, and upon which a minimum strain is exerted, thus allowing an exceedingly light structure to be employed.

It will further be appreciated that provision has been made for sudden jar or strain, and in addition to providing for ready longitudinal adjustment of the wagon, with relation to the implement, attachment of the vehicle and hitch is materially facilitated, it being merely necessary to run the tongue and wagon through the clevis of the draft bar and thereafter attach the chain or cable 17.

We claim:

1. A hitch of the character described comprising a draw bar, a draft bar slidably connected therewith and at a right angle thereto, a resilient connection between said draw bar and said draft bar, and manually controlled adjustable means connecting said draft bar with a wagon.

2. A hitch of the character described comprising a draw bar, a draft bar loosely connected therewith, a resilient connection between said draw bar and said draft bar, and flexible adjustable means for connecting said draft bar with a wagon.

3. A hitch of the character described comprising a draw bar, a draft bar slidably connected therewith at a right angle thereto, a resilient connection between said draw bar and said draft bar, means for connecting said draft bar with a wagon, and manually operable means carried by the draft bar for releasing said connection.

4. A hitch of the character described comprising a draw bar, a draft bar slidably connected therewith and at a right angle thereto, a resilient connection between the ends of said draft bar and said draw bar, means for connecting said draft bar with a wagon, and means carried by said draft bar for manually releasing said connecting means.

5. A hitch of the character described comprising a draw bar, a draft bar loosely associated therewith, a flexible connection between the ends of said draft bar and an intermediate portion of said draw bar, resilient means mounted in said connection, means for connecting one end of said draft bar with a wagon, and means for manually releasing said connecting means.

6. A hitch of the character described comprising a draft bar, a draw bar loosely connected with said draft bar intermediate its ends, a clip carried by said draw bar, a cable passing through said clip and connected with the ends of said draft bar, an expansible spring connecting said cable with said draft bar, a flexible connection between the draw bar and one end of the draft bar for attachment to a wagon, and manually operable means for releasing said flexible connection.

7. A hitch of the character described comprising a draft bar, a draw bar loosely connected with said draft bar intermediate its ends, a clip carried by said draw bar, a cable passing through said clip and connected with the ends of said draft bar, an expansible spring connecting said cable with said draft bar, a flexible connection between the draw bar and one end of the draft bar for attachment to a wagon, and manually operable means carried by the draft bar for normally securing said flexible connection and releasing the same upon actuation.

8. The combination of a tractor, an implement drawn thereby and a wagon with a hitch for said wagon comprising a draw bar connected with the tractor, a draft bar pivotally connected with the implement and loosely associated with the draw bar, a yieldable connection between the ends of said draft bar, and an intermediate portion of the draw bar, and means for connecting the free end of the draft bar with said wagon.

9. The combination of a tractor, an implement drawn thereby and a wagon with a hitch for said wagon comprising a draw bar connected with the tractor, a draft bar pivotally connected with the implement and loosely associated with the draw bar, a yieldable connection between the ends of said draft bar and an intermediate portion of the draw bar, means for connecting the free end of the draft bar with said wagon, and manually operable means for releasing said wagon connection.

AUGUST ROSENTHAL.
HENRY L. ROSENTHAL.